April 7, 1970 J. E. CHAPMAN III 3,504,757
ACOUSTIC WELL-LOGGING APPARATUS
Filed Nov. 20, 1968 2 Sheets-Sheet 1

Joseph E. Chapman, III
INVENTOR

BY *(signature)*
ATTORNEY

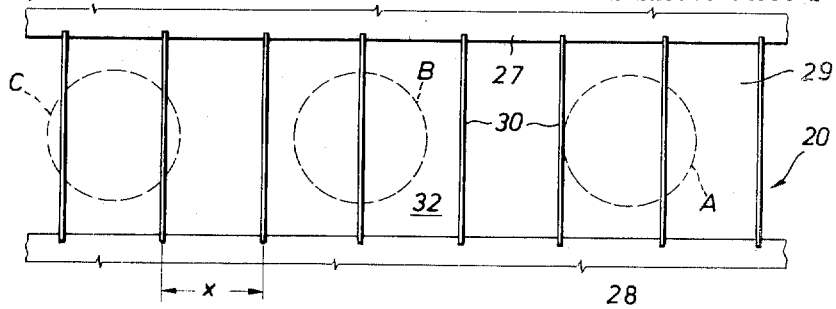
FIG. 4
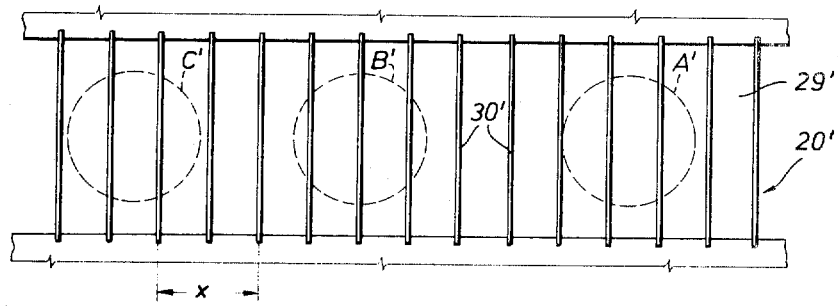
FIG. 5
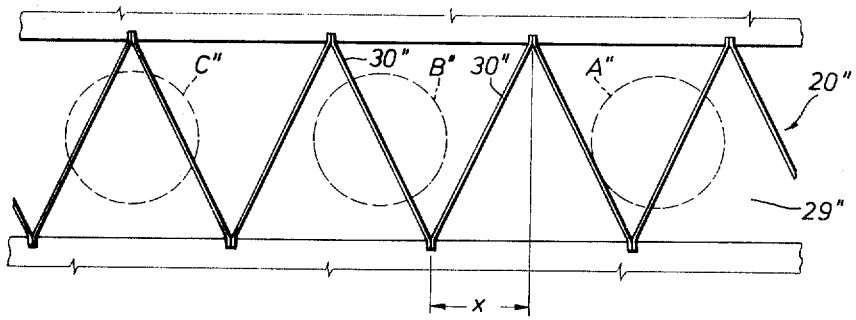
FIG. 6
FIG. 7
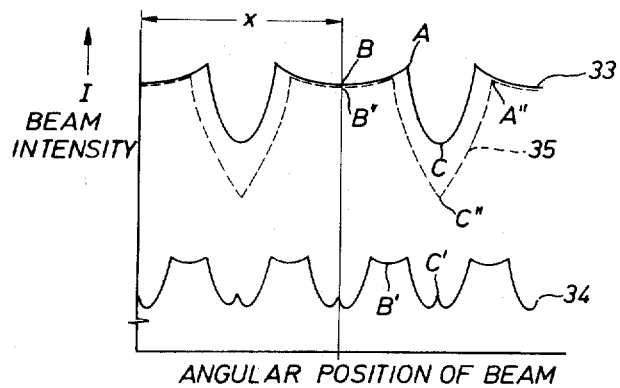
Joseph E. Chapman III
INVENTOR

United States Patent Office 3,504,757
Patented Apr. 7, 1970

3,504,757
ACOUSTIC WELL-LOGGING APPARATUS
Joseph E. Chapman III, Houston, Tex., assignor to Schlumberger Technology Corporation, New York, N.Y., a corporation of Texas
Filed Nov. 20, 1968, Ser. No. 777,422
Int. Cl. G01v 1/40
U.S. Cl. 181—.5     16 Claims

ABSTRACT OF THE DISCLOSURE

As a preferred embodiment of the invention disclosed herein, directional high-frequency acoustic transducer means are operatively mounted within a tubular housing and adapted for progressively scanning the circumference of a well bore wall surrounding the transducer means. To provide an efficient acoustic-energy passage around the transducer means without significantly weakening the housing, upper and lower sections of the housing are longitudinally separated and tandemly joined by a plurality of thin rigid members spaced around the resulting peripheral opening and uniquely arranged in one of several disclosed manners so as to only minimally obstruct the passage of acoustic energy therethrough.

---

Recent advances in techniques for investigating well bores have resulted in the development of acoustic-logging apparatus for providing visual displays of the well surfaces of a well bore. In general, such apparatus includes a cable-suspended well tool in which repetitively-operable directional acoustic transducer means operating at a high-frequency are rotated about the axis of the well bore. By progressively sweeping such repetitively-emitted and narrowly-beamed high-frequency acoustic signals around the circumference of the well bore wall, corresponding reflected signals will be obtained which will vary in accordance with various characteristics of the scanned well bore wall. Thus, as the tool is moved along a well bore, these narrowly-beamed reflected acoustic signals are appropriately converted into corresponding electrical signals to derive a record which is indicative of the characteristics of the successively-scanned portions of the well bore wall. Such records are, of course, particularly useful for indicating the presence of anomalies in a well bore wall as well as variations in the nature of the formation materials surrounding the well bore. In fact, present-day logging apparatus of this nature is capable of producing visual displays having sufficient resolution to portray even such minor anomalies as formation fractures in a borehole wall or perforations in a well casing.

It will, of course, be appreciated that to obtain an uninterrupted visual display of the circumeference of a well bore wall, the wall of the housing immediately surrounding the transducer means must not unduly affect either the transmission or the reception of the high-frequency acoustic signals in any direction. In addition to not affecting these narrowly-beamed acoustic signals, the housing wall enclosing the acoustic transducer means must also protect the transducer means from the severe environmental conditions typically found in well bores.

Since a relatively-high operating frequency (at least 500-kc. or greater) is required to achieve sufficiently-resolved visual displays, those skilled in the art have recognized that the enclosure around the transducers must be capable of passing acoustic energy without undue attenuation or scattering. However, the usual materials used for enclosing low-frequency acoustic-logging tools have been found to be incapable of efficiently passing high-frequency acoustic energy. Accordingly, typical high-frequency acoustic-logging tools have heretofore generally included tubular housing sections that are tandemly coupled together by an axial load-suporting member of minimum size so as to leave an unobstructed circumferential space between their adjacent ends that is covered by a thin elastomeric membrane to protect the rotatable transducer means behind the elastomeric cover. Those skilled in the art realize, however, that even the best of such constructional arrangements are not sufficiently rugged to adequately protect the relatively-fragile acoustic transducers usually employed in such tools. Moreover, for an axial supporting rod to be of sufficient strength, its size nevertheless significantly reduces the space available for the transducers as well as unduly complicates the mechanical design.

Accordingly, it is an object of the present invention to provide new and improved acoustic logging tools having a peripheral signal passage therein arranged to permit the efficient passage of selectively-directed high-frequency acoustic signals therethrough without significantly reducing the overall mechanical strength of the enclosure.

This and other objects of the present invention are attained by uniquely interconnecting the opposed ends of two longitudinally-separated, tubular housing sections of an acoustic logging tool with a plurality of thin, rigid members arranged to join the two sections as well as being circumferentially spaced at sufficient intervals to provide a substantially-continuous peripheral opening around the selectively-directional high-frequency acoustic transducer means operatively mounted in the housing. By spatially disposing these thin members around the peripheral opening in selected arrangements, only minimal interference will be presented to the passage of laterally-directed acoustic energy through the peripheral opening.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIGURES 4–6 schematically illustrate various embodiments of the present invention; and FIGURE 7 is a graphical representation of the operational characteristics of the embodiments shown in FIGURES 4–6.

Figure 1:
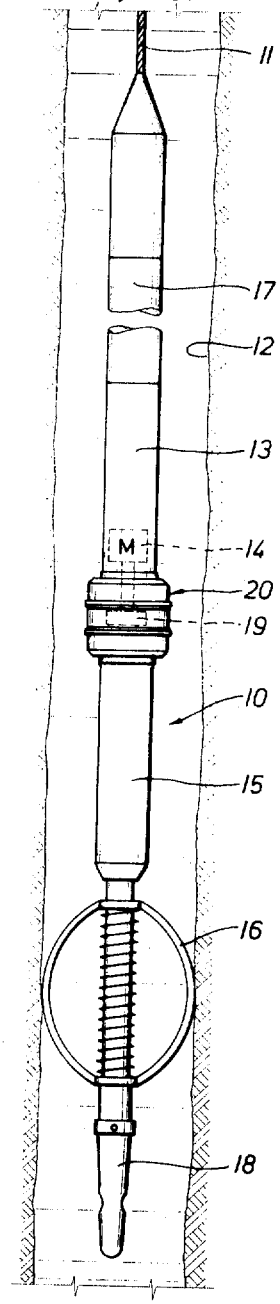
FIGURE 1 illustrates a typical acoustic logging tool arranged in accordance with the principles of the present invention.

Turning now to FIGURE 1, an acoustic logging tool 10 is shown suspended from a suitable cable 11 within a borehole 12. As is typical, logging tool 10 has an elongated supporting member which is conveniently arranged as a number of tandemly-connected housing sections which preferably include an intermediate section 13 enclosing a selectively-operable motor 14 and a lower housing section 15 carrying a centralizer 16 for maintaining the tool concentrically disposed in the borehole 12. In some instances, a second centralizer (not shown) may also be mounted, as on an upper housing section 17, near the upper end of the tool 10. To absorb the shocks resulting upon striking obstructions as the tool is being lowered into the borehole 12, a resilient nose piece 18 is preferably mounted on the bottom end of the lower housing section 15.

Inasmuch as the present invention is particularly directed to the new and improved enclosure for the acoustic-logging tool 10, the specific details of the electrical circuitry employed in the tool and at the surface are, therefore, of no particular significance in fully understanding the invention here. Thus, it is sufficient to say only that a preferred embodiment of the circuitry for the tool 10 is fully described in a copending application, Ser. No. 697,796, filed Jan. 15, 1968.

In this new and improved circuitry, directional high-frequency acoustic-transducer means (such as at 19 in FIGURE 1) having a laterally-directed axis of operation are adapted to be rotated about the vertical axis of the tool 10 by the motor 14 so as to progressively traverse the operational axis of the transducer means along a predetermined plane transverse to the tool axis. By arranging the transducer means 19 within a housing section or enclosure 20 arranged in accordance with the principles of the present invention, the adjacent surfaces of the well bore (such as the wall of the borehole 12) will be progressively subjected to repetitive bursts of radially-directed high-frequency acoustic energy at a selected frequency between 500-kilocycles/second and 5-megacycles/second.

As these outwardly-directed bursts of acoustic energy progressively scan the circumference of the borehole 12, the resulting reflections of acoustic energy (which are, of course, influenced by the composition or character of the borehole wall) received by the rotating transducer means 19 will develop corresponding electrical signals. By means of the electrical circuitry, these electrical signals in turn produce a continuous record or visual display on an image-reproducing device, such as an oscilloscope, included with the circuitry at the surface. The electrical circuitry also preferably includes appropriate means for presenting at the surface depth-correlation information as well as indications of the angular or azimuthal position of the transducer means 19. As a result, the resulting visual record provided by the logging tool 10 will present a fairly-representative picture of the well bore wall which has sufficient resolution for locating even small defects such as fractures or casing perforations. Moreover, by virtue of the correlative depth and azimuth information, the position in the well bore of any anomalies shown on the visual record can be accurately determined.

Figure 2:
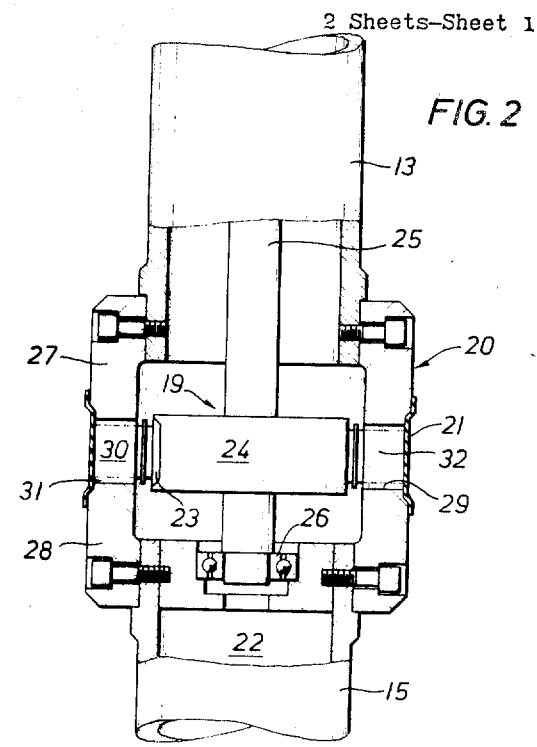
FIGURE 2 is a partially cross-sectioned elevational view of the central portion of the logging tool depicted in FIGURE 1 showing a preferred embodiment of the present invention.

Turning now to FIGURE 2, a detailed view is shown of a preferred embodiment of the housing section 20 arranged in accordance with the present invention to provide a circumferential opening therein. To exclude dirty well bore fluids from the interior of the logging tool 10, the tubular housing sections 13, 15 and 20 are fluidly sealed at their respective coupled ends and a thin, fluid-tight sleeve 21 of an elastomeric or selected plastic material is disposed around the opening in the section 20. Where the sleeve 21 is of plastic, it is preferred to use a rigid plastic material such as an aromatic polyimide resin composition presently marketed, for example, by E. I. du Pont de Nemours & Co. under the trademark of Vespel.

A typical pressure-compensating piston (not shown) is slidably disposed in the lower housing section 15 and the interior spaces 22 of the housing sections thereabove are filled with a suitable oil or such (not shown). Thus, by admitting well bore fluids into the lower portion of the housing section 15, the pressure-compensating piston will maintain the oil in the spaces 22 above the piston at hydrostatic pressure of the well bore fluids as well as accommodate volumetric changes caused by temperature variations of the oil.

In the preferred manner of arranging the radially-directional acoustic transducer means 19, a typical high-frequency transducer, such as a piezoelectric crystal 23, is mounted on one side of an enlarged-diameter shoulder 24 near the lower end of an elongated axial shaft 25 that is journalled on a bearing 26 coaxially mounted within the housing 20. The upper portion of the shaft 25 is extended upwardly through aligned bearings or annular guides (not shown) and operatively coupled to the motor 14 (FIGURE 1) thereabove for rotating the outwardly-facing transducer crystal 23 about the central axis of the logging tool 10. The previously-described electrical circuitry is arranged to cyclically energize the crystal 23 to produce repetitive outwardly-directed bursts of beamed acoustic energy as well as to alternately use the crystal for receiving the inwardly-directed reflections resulting from each burst before the next burst is transmitted. Thus, by means of appropriate sequencing circuitry, the crystal 23 alternately transmits and receives well-defined beams of radially-directed acoustic energy for developing corresponding electrical signals which produce the previously-described visual record.

In general, the intermediate housing 20 is comprised of upper and lower longitudinally-spaced tubular members 27 and 28 uniquely joined to one another, with the upper member being tandemly interconnected to the housing section 13 and the lower member being similarly coupled to the housing section 15. Moreover, although the upper and lower members 27 and 28 of the housing 20 are stoutly joined to one another to withstand well bore service, the tubular members are uniquely joined to provide a substantially-continuous circumferential aperture or opening 29 behind the sleeve 21 through which laterally-directed acoustic energy can be efficiently passed in any angular direction.

Figure 3:
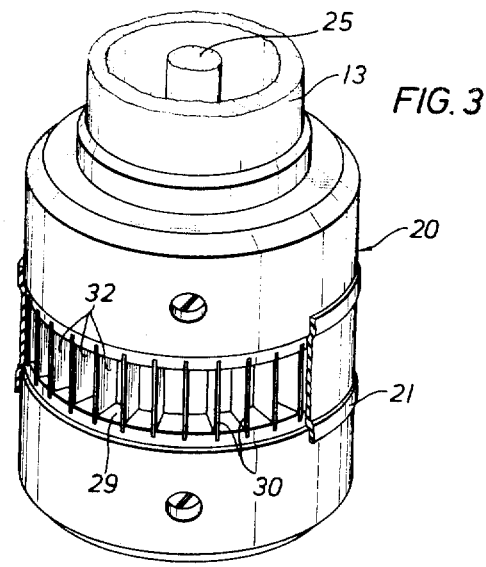
FIGURE 3 is an isomeric view of the central housing section of the logging shown in FIGURE 2.

Accordingly, as depicted in FIGURES 2 and 3, the opposed ends of the upper and lower tubular members 27 and 28 are spaced apart a distance to make the height of the opening 29 at least slightly greater than the anticipated vertical height of the directed beams of acoustic energy that are to pass therethrough. In the preferred manner of joining the spaced tubular members 27 and 28 to one another, a plurality of rigid strips or upright struts 30 of steel or the like are circumferentially spaced around the opposed ends of the tubular members with the ends of these struts being respectively secured to the opposed ends of the tubular members. As shown, the preferred constructional arrangement is to form a corresponding number of equally-spaced radial slots in the opposed ends of the two members 27 and 28 for complementally receiving the end portions of the struts 30 which are then brazed or silver soldered, as at 31, to the tubular members.

It will be appreciated, therefore, that with a substantial number of the struts 30, the new and improved housing section 20 will have considerable mechanical strength. Moreover, although the struts 30 have a relatively-thin transverse dimension or thickness, by making their lateral dimension or width approximately equal to the wall thickness of the upper and lower tubular members 27 and 28 as well as limiting the free length of the struts, the assembled housing section 20 will readily withstand even substantial compressive and torsional loads.

As best seen in FIGURE 3, the upright struts 30 are disposed about the circumferential opening 29 and turned edgewise so as to define a corresponding number of radially-directed lateral apertures, as at 32, that are preferably spaced equally around the housing section 20. Moreover, it will be appreciated that by turning the thin struts 30 edgewise, their transverse dimension will present a minimum obstruction to the passage of acoustic energy through the radial apertures 32 as the directed beam of acoustic energy from the transduced means 19 is progressively swept around the circumferential opening 29.

Two problems are, however, presented by the struts 30. First of all, it will be appreciated that the total acoustic energy that can be passed through the circumferential opening 29 at any angular position of the transducer 23 will be inversely related to the total transverse cross-sectional area of a strut 30 (or struts) being cut at that moment by the acoustic beam. Stated another way, the only acoustic energy that will pass through the opening 29 will be from that portion of the beam that is not impinging on one or more of the struts 30 or portions thereof. Thus, since the acoustic beam has a specified, well-defined cross-sectional area, if the acoustic beam is cutting one of the struts 30, the amount of energy that will successfully pass through the opening 29 will, for all practical purposes, be directly related or approximately proportional to the unobstructed cross-sectional area of the beam. Conversely, if the acoustic beam can be directed between two of the struts 30 without impinging on either, the full energy of the beam will pass through the opening 29 without reduction.

The obvious solution to this first problem would seem to be reduction of the number of supports or struts 30. This has been found, however, to be wholly impractical. First of all, for the tool 10 to be useful in actual field service, the mechanical strength of the enclosure 20 must not be unduly compromised. Thus, if only a few struts 30 were employed, their thickness would be so excessive that the acoustic beam would be significantly attenuated as it traversed over such members and an unreasonably-large area of the adjacent well bore surface would not be examined. Accordingly, it has been found that a more-comprehensive examination of a well bore is obtained with a fair number of relatively-thin struts 30 as illustrated in the drawings.

To illustrate the second problem, FIGURES 4 and 5 respectively depict a developed view of two enclosures 20 and 20′ providing similar circumferential openings 29 and 29′ in which the struts 30 and 30′ are spaced somewhat less than the diameter of the acoustic beam which is alternatively shown in selected angular positions A–C. Accordingly, considering FIGURE 4, when the beam is in the angular position A so as to be offset in relation to any one of the struts 30, the reduction in acoustic energy passing through the opening 29 will be only minimal. Similarly, when the beam is directed (as at B) so as to be bisected by one of the struts 30, the beam will be attenuated only slightly more than when it is in the angular position shown at A. The maximum attenuation to the acoustic beam is, of course, when the beam is positioned (as at C) so as to uniformly straddle an adjacent pair of the struts 30.

It will be understood, therefore, that the progressive traversal of the beam around the circumferential opening 29 will cyclically attenuate the acoustic beam in a manner such as illustrated by the curve at 33 in FIGURE 7. Accordingly, with an arrangement of the struts 30 as shown in FIGURE 4, the overall level of acoustic energy passing through the circumferential opening 29 will be relatively high except at those periodic moments when the beam is in one of the angular positions at C. It will be appreciated, however, that the cyclical changes in beam intensity between the relatively-equal maximum points A and B and the minimum point C on the curve 33 will produce corresponding amplitude excursions in the electrical signals developed by the circuitry for the tool 10. These variations in signal strength will, of course, correspondingly affect the visual record obtained at the surface.

It is, therefore, these undesirable fluctuations in signal strength that constitue the previously-mentioned second problem presented by the struts 30. Accordingly, in keeping with the objects of the present invention, it has been found that where these fluctuations in signal intensity are of sufficient magnitude to impair the overall quality of the desired visual record, by spacing the struts 30 more closely these undesirable swings or ripple will be reduced to an acceptable level.

Accordingly, to illustrate the effect of closer spacing of the struts 30, the enclosure 20′ is shown in FIGURE 5 with the upright struts 30′ having a circumferential spacing that is half of the spacing between the struts 30 of the enclosure 20. With closely-spaced struts, as at 30′, it has been found that the overall attenuation of the acoustic beam will be greater. Thus, as represented by the curve 34 in FIGURE 7, with everything else being equal, the closer spacing of the struts 30′ will significantly reduce the level of acoustic energy that will strike the borehole wall. The corresponding reduction in the input signal level to the circuitry for the tool 10 can, however, be compensated for by proper design in the circuitry such as, for example, added amplification.

Of more importance, it should be particularly noted that the variations in signal intensity or amplitude excursions have been significantly reduced. Thus, although the general level of acoustic energy is somewhat reduced by the closely-spaced struts 30′, the difference between the maximum and minimum signal levels is significantly reduced so as to produce a superior visual record. It has been found that as the spacing between the struts 30 (or 30′) is narrowed, the signal fluctuation or percentage of "ripple" will be reduced at a faster rate than the associated rate of reduction in the overall signal strength. Accordingly, a sufficiently smooth signal can be obtained before the overall signal strength is unduly reduced. It should also be realized that although the drawings do not show such minor dimensional changes, the struts 30′ can be somewhat thinner than the struts 30 without affecting the mechanical strength of the tool 10.

In a typical embodiment of the present invention, with an enclosure such as those shown at 20 or 20′ for enclosing a transducer operating at 1-megacycle/second, it was found that by making the struts only 0.030-inch thick, the resulting "shadows" on the visual display had little or no effect on the clarity of the display and the assembled enclosure was capable of withstanding even rigorous field service. Those skilled in the art will, of course, appreciate that 0.030-inch is substantially one-half wavelength for a 1-megacycle/second acoustic signal in those liquids typically found in a well bore. Analyses have shown, therefore, that such shadows are minimized by using struts with a thickness of about one wavelength or less at the operating frequency. On the other hand, as the thickness of the struts increases and approaches about 5 to 10 wavelengths, the resulting "shadows" become objectionable. It was also found that sharpening the longitudinal edges of the struts further improved the quality of the visual displays.

It will be appreciated that although the vertical struts as at 30 or 30′ are preferred, other arrangements can be devised to provide sufficient mechanical strength without unduly affecting the passage of acoustic energy. For example, as shown in FIGURE 6, a plurality of alternately-inclined struts 30″ can be arranged to provide an enclosure 20″ of adequate strength and having a relatively unobstructed circumferential opening 29″. To give some comparison of the degree of signal attenuation, the curve 35 is included in FIGURE 7. Accordingly, it will be appreciated that the enclosure 20″ depicted in FIGURE 6 will produce a signal attenuation very similar to that produced by the enclosure 20 in FIGURE 4.

Accordingly, although changes and modifications may be made in the disclosed embodiments without departing from the principles of the present invention as set forth in the following claims, it will be appreciated that the present invention provides new and improved acoustic-logging apparatus for well bores. By joining spaced housing members with a plurality of structural members arranged as disclosed herein, an effective lateral opening is provided for the passage of acoustic energy without the mechanical strength of the tool being unduly compromised.

I claim:

1. Acoustic-logging apparatus adapted for suspension in a well bore and comprising: a support having upper and lower members with longitudinally-separated opposed end portions defining a space therebetween; a high-frequency acoustic transducer operable at a frequency of at least about 500-kilocycles/second mounted on said support and having a selectively-directed axis of operation adapted for progressive traversal in a lateral plane lying between said opposed end portions; and means for tandemly interconnecting said support members consisting solely of a plurality of rigid members having symmetrical transverse cross sections with major and minor axes and respectively secured to said opposed end portions at spaced intervals around the perimeter of said space with their minor axes perpendicular to said axis of operation for defining a plurality of peripherally-spaced openings therebetween adapted to be successively traversed by said axis of operation upon operation of said acoustic transducer and presenting minimum obstructions to the passage of acoustic energy through said peripheral openings.

2. The logging apparatus of claim 1 further including: a sleeve member adapted to pass high-frequency acoustic energy mounted around said peripherally-spaced openings and fluidly sealed in relation to said opposed end portions for enclosing said space.

3. The logging apparatus of claim 1 wherein said rigid members are strips of metal having generally-rectangular transverse cross sections.

4. The logging apparatus of claim 1 wherein said rigid members are strips of metal having a thickness along said minor axes of between 0.030 and 0.060-inch.

5. The logging apparatus of claim 1 wherein said rigid members are flat strips of metal mounted in a generally-upright position around said space and turned edgewise in relation to said axis of operation for presenting minimum obstruction to the passage of acoustic energy through said peripheral openings.

6. The logging apparatus of claim 1 wherein said rigid members are strips of metal having generally-rectangular transverse cross-sections with flat sides and narrow longitudinal edges mounted in substantially-upright positions between said opposed end portions and respectively secured thereto with their said flat sides substantially parallel to said axis of operation for presenting minimum obstruction to the passage of laterally-directed acoustic energy through said peripheral openings.

7. The logging apparatus of claim 6 wherein said metal strips are mounted substantially perpendicular to said lateral plane of operation so as to make said peripheral openings generally rectangular.

8. The logging apparatus of claim 6 wherein said metal strips are inclined in relation to said lateral plane of operation with every odd-numbered metal strip being inclined in one direction and every even-numbered metal strip being inclined in the opposite direction so as to make said peripheral openings generally triangular.

9. The logging apparatus of claim 5 wherein the thickness of said metal strips is no greater that about one wavelength of said acoustic frequency in well bore fluids.

10. Acoustic-logging apparatus adapted for suspension in a well bore and comprising: a housing arranged along a central axis and including upper and lower tubular members having opposed end portions axially spaced from one another for defining a space therebetween; a high-frequency acoustic transducer having an operating frequency of at least about 500-kilocycles/second operatively mounted in said space for selective rotation about said central axis and having a directed lateral axis of operation for progressive traversal around the perimeter of said space; and means for tandemly interconnecting said tubular members consisting solely of a plurality of rigid metal strips having generally-rectangular transverse cross-sections spatially disposed at equal intervals along said perimeter of said space and respectively having their upper and lower ends secured to said opposed end portions, said metal strips being respectively oriented with their major transverse axes perpendicular to said central axis for providing a plurality of peripheral openings bounding said space with minimal obstruction presented by said metal strips to the passage of laterally-directed acoustic energy through said peripheral openings.

11. The logging apparatus of claim 10 wherein said acoustic transducer is adapted for repetitively transmitting an outwardly-directed beam of acoustic energy having a predetermined height and width, and said peripheral openings respectively have a height greater than said beam height and a width less than said beam width.

12. The logging apparatus of claim 11 wherein said widths of said peripheral openings are less than half of said beam width.

13. The logging apparatus of claim 11 wherein the transverse thickness of each of said metal strips is no greater than about one wavelength of said operating frequency in well bore fluids.

14. The logging apparatus of claim 11 wherein the transverse thickness of each of said metal strips is between 0.030 and 0.060-inch.

15. The logging apparatus of claim 13 wherein the longitudinal axes of said metal strips are parallel to said central axis to give said peripheral openings a rectangular shape.

16. The logging apparatus of claim 13 wherein said metal strips are inclined in alternate first and second directions around said space to give said peripheral openings a triangular shape.

References Cited

UNITED STATES PATENTS

| 2,631,270 | 3/1953 | Goble | 181—0.5 |
| 2,648,056 | 8/1953 | Jakosky | 181—0.5 |
| 3,390,737 | 7/1968 | Johnson | 181—0.5 |

RICHARD A. FARLEY, Primary Examiner

C. E. WANDS, Assistant Examiner

U.S. Cl. X.R.

340—8